US 008571016B2

(12) United States Patent
Urzi et al.

(10) Patent No.: US 8,571,016 B2
(45) Date of Patent: Oct. 29, 2013

(54) CONNECTION ARRANGEMENT

(75) Inventors: Ignazio Urzi, Voreppe (FR); Daniele Mangano, Messina (IT); Claire Bonnet, Grenoble (FR)

(73) Assignee: STMicroelectronics (R&D) Ltd, Marlow, Buckinghamshire (GB)

( * ) Notice: Subject to any disclaimer, the term of this patent is extended or adjusted under 35 U.S.C. 154(b) by 112 days.

(21) Appl. No.: 13/161,361

(22) Filed: Jun. 15, 2011

(65) Prior Publication Data

US 2012/0008620 A1 Jan. 12, 2012

(30) Foreign Application Priority Data

Jul. 8, 2010 (EP) .................................... 10305762

(51) Int. Cl.
*H04L 12/66* (2006.01)
(52) U.S. Cl.
USPC .......................................... 370/352; 370/360
(58) Field of Classification Search
USPC ........... 370/338, 473, 235, 328, 342; 713/189
See application file for complete search history.

(56) References Cited

U.S. PATENT DOCUMENTS

| 2004/0218586 | A1 | 11/2004 | Khoury et al. | |
| 2005/0243782 | A1* | 11/2005 | Sakoda et al. | 370/338 |
| 2006/0222012 | A1* | 10/2006 | Bhargava et al. | 370/473 |
| 2008/0005586 | A1* | 1/2008 | Munguia | 713/189 |
| 2008/0049706 | A1* | 2/2008 | Khandekar et al. | 370/342 |
| 2008/0144502 | A1* | 6/2008 | Jackowski et al. | 370/235 |
| 2010/0260100 | A1* | 10/2010 | Kerr et al. | 370/328 |

OTHER PUBLICATIONS

EPO Search Report for EP 10305762.6 mailed Sep. 29, 2010 (5 pages).
Lee J W et al: "Globally-Synchronized Frames for Guaranteed Quality-of-Service in On-Chip Networks," Computer Architecture, 2008, ISCA '08; 35th International Symposium on, IEEE, Piscataway, NJ, USA, Jun. 21, 2008, pp. 89-100.
Tobias Bjerregaard and Jens Sparso: "A Router Architecture for Connection-Oriented Service Guarantees in the MANGO Clockless Network-on-Chip," ACM, 2 Penn Plaza, Suite 701—New York USA ORD, Mar. 11, 2005 (6 pages).
Hollstein et al: "Advanced Hardware/Software Co-Design on Reconfigurable Network-on-Chip Based Hyper-Platforms," Computers & Electrical Engineering, vol. 33, No. 4, May 16, 2007 (pp. 310-319).

* cited by examiner

*Primary Examiner* — Asad Nawaz
*Assistant Examiner* — Parth Patel
(74) *Attorney, Agent, or Firm* — Gardere Wynne Sewell LLP

(57) ABSTRACT

A plurality of inputs are configured to receive circuit switched traffic from a plurality of initiators. A plurality of outputs are configured to output said traffic to a network on chip. Each output is associated with a different quality of service traffic. A traffic controller directs the received circuit switched traffic to respective ones of the outputs in dependence on a quality of service associated with the traffic.

22 Claims, 5 Drawing Sheets

CONNECTION ARRANGEMENT

PRIORITY CLAIM

This application claims priority from European Application for Patent No. 10305762.6 filed Jul. 8, 2010, the disclosure of which is hereby incorporated by reference.

TECHNICAL FIELD

The present invention relates to a connection arrangement and in particular but not exclusively to a connection arrangement for use on an integrated circuit.

BACKGROUND

Integrated circuits have an ever increasing number of components thereon. System On Chip (SoC) provide multiple computer components or in some cases entire electronic systems on a single chip. Network-on-Chip (NoC) brings network communication techniques into the chip environment. It has been proposed to provide circuit switched communication and network-on-chip based architecture on a single integrated circuit.

SUMMARY

According to a first aspect, there is provided a connection arrangement comprising: a plurality of inputs configured to receive circuit switched traffic from a plurality of initiators; a plurality of outputs configured to output said traffic to a network on chip, each of said outputs being associated with a different quality of service traffic; and a traffic controller configured to direct the received circuit switched traffic to respective ones of the outputs in dependence on a quality of service associated with said traffic.

According to a second aspect there is provided a method comprising: receiving circuit switched traffic from a plurality of initiators; directing the received circuit switched traffic to respective ones of a plurality of outputs in dependence on a quality of service associated with said traffic, each of said outputs being associated with a different quality of service; and outputting, via said outputs, said traffic to a network on chip.

BRIEF DESCRIPTION OF THE DRAWINGS

Some embodiments of the present invention will now be described by way of example only to the accompanying drawings in which.

DETAILED DESCRIPTION OF THE DRAWINGS

Figure 1:
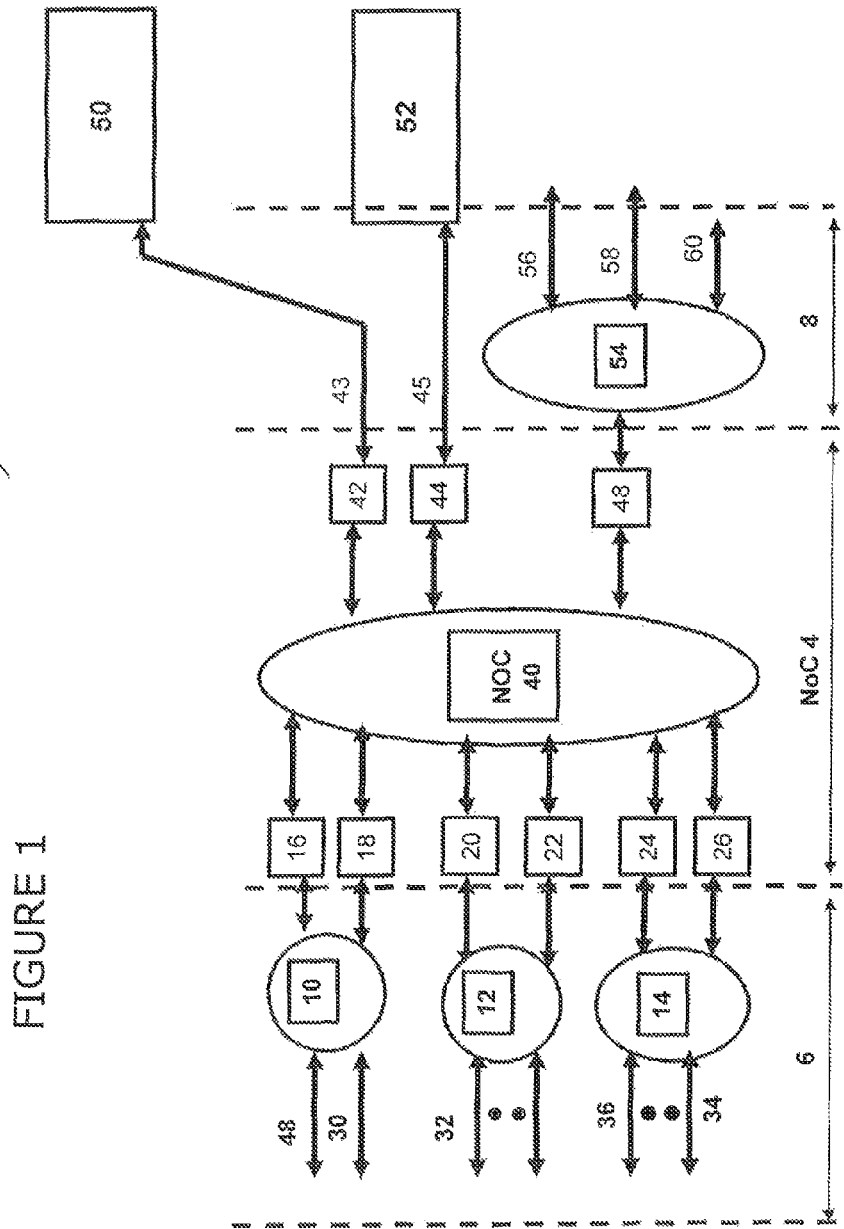
FIG. 1 schematically shows an integrated circuit.

Reference is made to FIG. 1 which shows an integrated circuit in which embodiments of the present invention can be incorporated. The integrated circuit 2 comprises a network-on-chip NoC environment 4. The network-on-chip environment 4 is configured to interface with a first circuit switched environment 6 and a second circuit switched environment 8. In practice, an initiator may cause a request, data or the like to go from one circuit switched environment to the other, via the network-on-chip environment 4.

Referring first to the first circuit switched environment 6, three bus nodes 10, 12 and 14 are shown. Each bus node 10, 12 and 14 is arranged to connect to a pair of network interfaces NI. The network interfaces provide an interface between the first circuit switched environment and the network-on-chip environment. The first bus node 10 is connected to first and second network interfaces 16 and 18. The second bus node 12 is connected to third and fourth network interfaces 20 and 22. The third bus node 14 is connected to fifth and sixth network interfaces 24 and 26.

The initiators can take any suitable form. One or more initiators may be latency critical. The delay associated with the propagation of the request, data or the like from the initiator might need to be minimized or at least not exceed a certain value. One or more initiators may be bandwidth intensive. One or more initiators may have other requirements such as best effort delivery.

Of course, it should be appreciated that a given initiator may have more than one requirement. For example one initiator may have first bandwidth and first latency requirements for a first type of traffic and second bandwidth and second latency requirements for a second type of traffic. The first and second bandwidths may differ. The first and second latencies may differ. It should be appreciated that, in some embodiments of the invention, in different scenarios or applications an initiator may have different quality of service requirements.

By way of example only, the first bus node 10 has respective connections 48 and 30 to display and graphic initiators. The second bus node 12 is arranged to have a plurality of connections 32 to video decoding initiators. The third bus node 14 has a number of different connections which by way of example may be USB connections 34 and SATA (Serial Advance Technology Attachment) connections 36 to an initiator.

The first to sixth network interfaces 16 to 26 are connected to a central network-on-chip node 40. In practice the NoC node comprises a NoC environment providing a routing arrangement. The central network-on-chip node 40 is connected to a seventh network interface 42, an eighth network interface 44 and a ninth network interface 48. The seventh to ninth network interfaces 42, 44 and 48 are connected to the second circuit switched environment 8. In particular, the seventh network interface 42 is connected via link 43 to a first memory controller 50 which provides an interface to a first DDR SDRAM (double data rate synchronous data random access memory) which will be referred to as DDR1. The eighth network interface 44 is connected via link 45 to a second memory controller 52. The second memory controller 52 is connected to a second DDR SDRAM which will be referred to as DDR2.

The ninth network interface 48 is connected to a bus node 54 in the second circuit switched environment 8. This further bus node 54 has various outputs. For example, one output 56 is to a EMI (External Memory Interface) or PCI (Protocol Control Information) master. The bus node 54 has output 58 to an audio peripheral. The bus node 54 also has an output 60 to configuration registers.

The bus interconnect for high bandwidth demanding SoC is moving towards a network-on-chip based solution. With this, it is an aim to provide accurate control of the required quality of service QoS for at least some processes or initiators generating traffic on the bus. The network-on-chip arrangement allows the setting up of quality of service on the entry point of the network using initiator network interfaces. In some embodiments of the present invention it may not be practical to assign a network interface to each initiator as this may lead to a significant area increase and may require complex software configuration of the bus interconnect. Accordingly, in some embodiments of the present invention, the bus interconnect is arranged to use a mixture of circuit switched and network-on-chip based architecture.

In some embodiments of the present invention, the initiators are grouped together using circuit switched based interconnect islands. These islands are the bus nodes shown in FIG. 1. One or more network interfaces are dedicated to each of these bus nodes to provide a common service access point to the central network-on-chip node 40 to those initiators connected to that bus node. Some embodiments of the present invention thus may allow the integration of a circuit switched based bus node with a central network-on-chip node managing the overall system quality of service.

Figure 2:
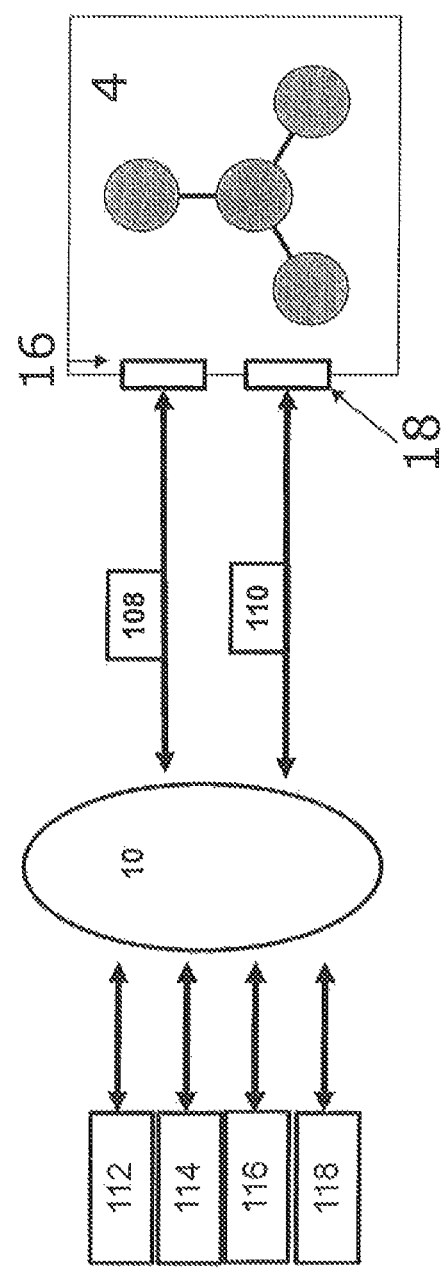
FIG. 2 is used to show two method of interconnecting between a circuit switched environment and a network-on-chip environment.

Reference is made FIG. 2 which is used to illustrate firstly a traditional connection of circuit switched based bus nodes with a central network-on-chip. This arrangement requires a predefined fixed topology. In FIG. 2, the first bus node 10 has a first link 108 to a first network interface 16. The bus node 10 has a second link 110 to the second network interface 18. In a classical circuit switched based interconnect, the routing algorithm is based on address decoding. This would lead to a scheme where each link 108 and 110 connecting the circuit switched based bus node and a network-on-chip 4 is permanently assigned to a given system-on-chip target. For example, the first link 108 may be permanently assigned to DDR1 while the second link 110 may be permanently assigned to DDR2. However, this configuration may not offer enough flexibility to deal with managing different quality of service, from the same circuit switched bus node, inside the network-on-chip.

By way of example only, the four initiators shown in FIG. 2 are GDP (graphic data processors). The GDPs which reads the graphic buffers are associated with a unique DDR. With the arrangement shown in FIG. 2, the traffic from each of these initiators would all enter in the network-on-chip by only one of the two network interfaces. The network interface would have to be programmed with the quality of service of all four traffic flows. If traffic flows have two different sets of quality of service requirements, such as where two initiators are reading the HD buffers and two initiators are reading SD buffers, grouping the four initiators does not provide a sufficient amount of network-on-chip control.

Reference is again made to FIG. 2 while an embodiment of the present invention is schematically described. In this embodiment, the bus node 10 of FIG. 2 is modified in comparison to the previously described arrangement. The bus node 10 is arranged to implement an algorithm on top of the address decoding which allows the routing of traffic to the two available links 108 and 110 depending of their quality of service requirements. In other words, the first link 108 (referred to as link 1) is associated with a first quality of service and the second link 110 (referred to as link 2) is associated with a second quality of service. The initiators are again GDPs. In the example shown, the first and second initiators 112 and 114 are both associated with HD graphics (498 MB/s) while the third and fourth initiators 116 and 118 are associated with SD graphics (41 MB/s). Accordingly, there is a first quality of service requirement with the first two initiators 112 and 114 and a second different quality of service requirement with the second two initiators 116 and 118.

Now in the arrangement of FIG. 2, the first network interface 16 is associated with a HD quality of service while the second network interface 18 is associated with a SD quality of service. Accordingly, the node 10 is arranged to route traffic from the first two initiators onto link 1 (108) which is associated with the HD quality of service and traffic from the third and fourth initiators 116 and 118 onto link 2 (110) which is associated with the SD quality of service. The traffic is routed to two different service access points of the network-on-chip, that is the first network interface 16 and the second network interface 18. This allows the programming of different quality of services for the two aggregated traffic types.

Figure 3:
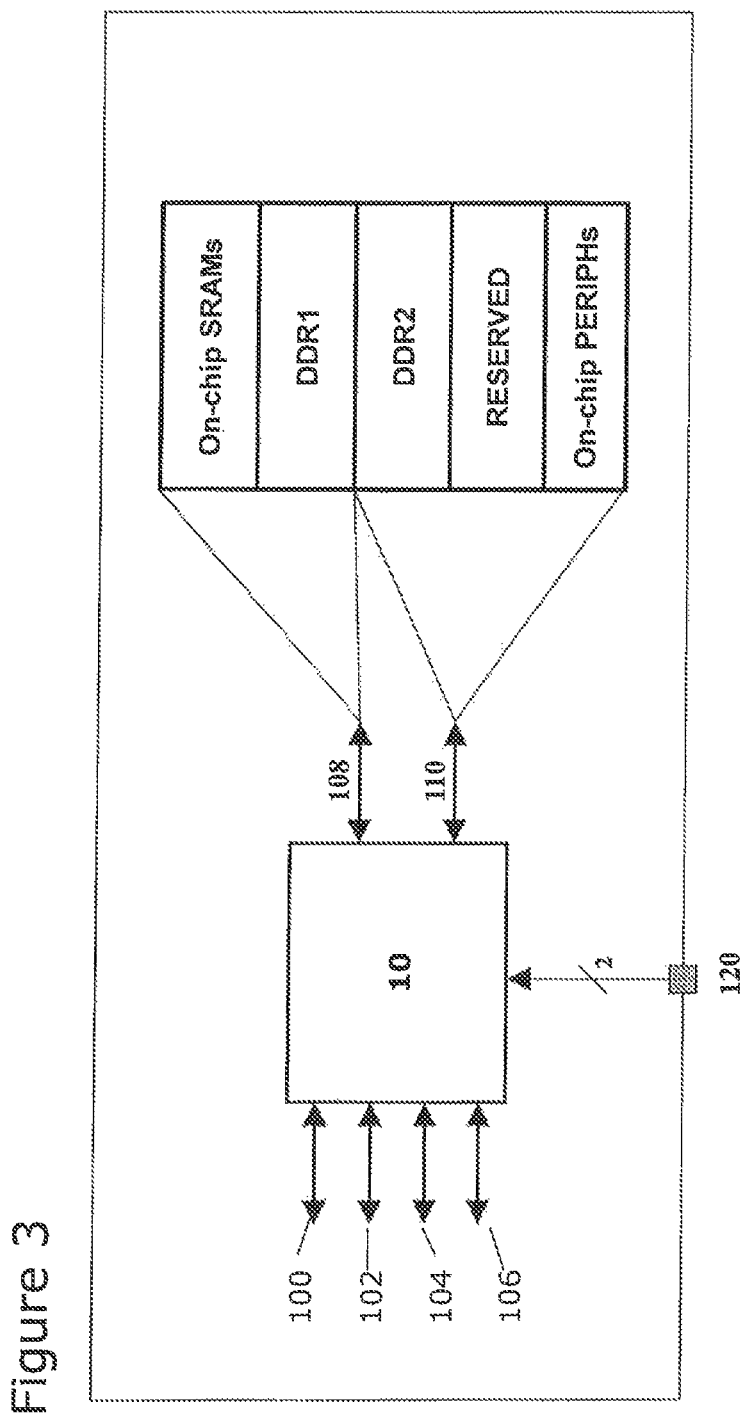
FIG. 3 shows a schematic view of a node in one embodiment of the present invention.

Reference is now made to FIG. 3 which shows in more detail an embodiment of the present invention. The node 10 of FIG. 3 is now discussed in more detail. That node is connected to respective initiators by connections 100, 102, 104 and 106. That bus node 10 is arranged to receive a path select input 120. The path select input signal is referred to a path_select. It should be appreciated that a separate path select signal is provided for each initiator. FIG. 3 shows only one of the path select signals for the initiator.

In one embodiment of the present invention, three values for the path select signal are used. When the path select signal value is 0 (that is 00), a default routing is used. This is schematically shown in FIG. 3. With the default routing, the first link 108 is connected to on-chip SRAM and DDR1 and the second link 110 is connected to DDR2 and the on-chip peripherals. However, when the path select value is equal to 1 (that is 01), the traffic toward the DDR1 is routed through link 2. When the path select value is equal to 2 (that is 10), the traffic towards DDR2 is routed via link 1. This allows the different quality of services to be allocated to different links.

Figure 4:
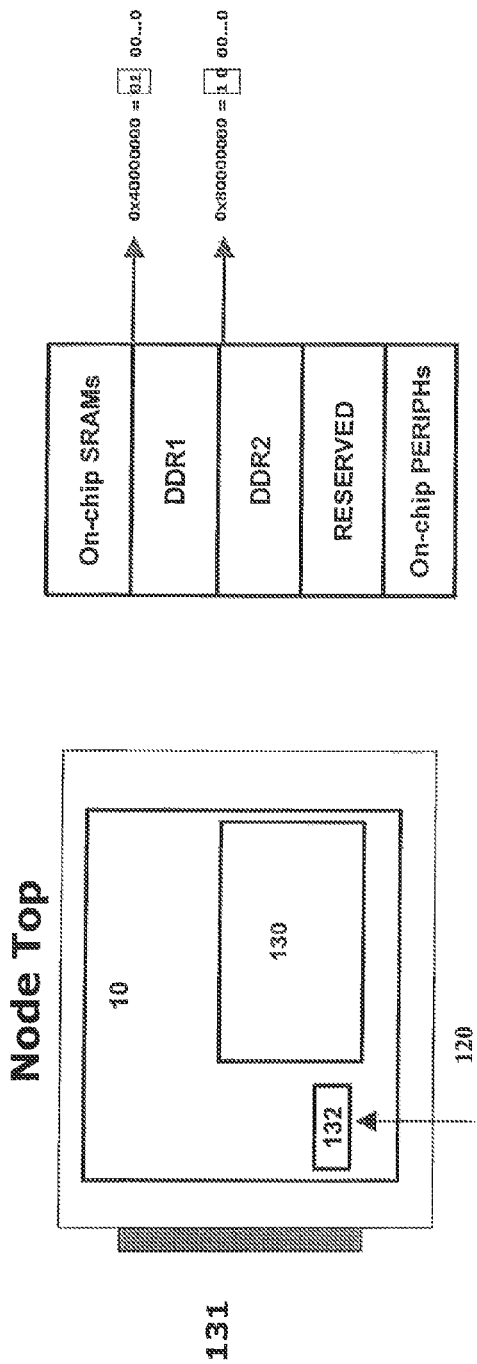
FIG. 4 shows the node of FIG. 3 in more detail.

Reference is now made to FIG. 4 which shows the arrangement of FIG. 3 in more detail. In particular, the node 10 is shown as comprising an address decoder 130 and path selection circuitry 132. The path selection circuitry is shown in more detail in FIG. 5 and is configured to receive a two bit path select signal. The node has an initiator port 131 which receives the traffic from the initiator. Depending on the value of the path select signal, the link address may be altered such that the traffic is routed onto a different link.

It should be appreciated that the link address is altered at the address decoder level. It should be appreciated that in some embodiments the modified link address is not forwarded.

It should be appreciated that in some embodiments of the invention, each initiator is provided with its own port.

Figure 5:
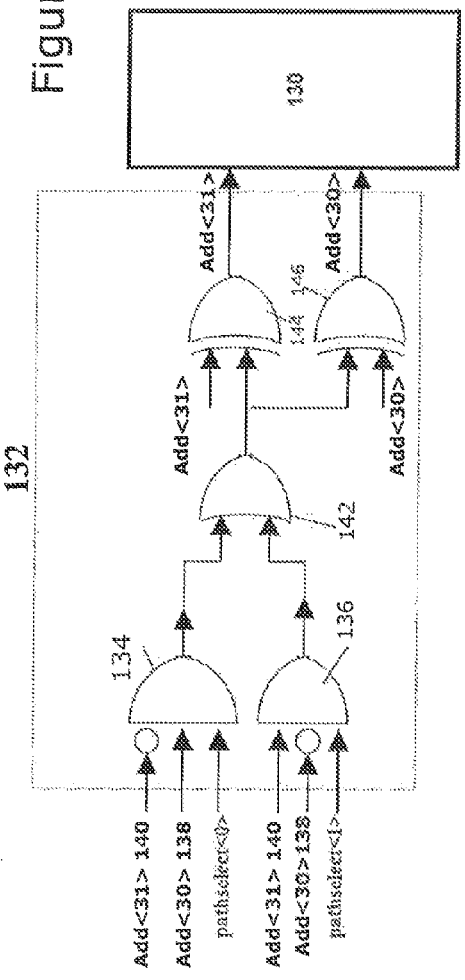
FIG. 5 shows part of the circuitry of FIG. 4.

Reference is made to FIG. 5 which shows the path selection circuitry 132 of FIG. 4 in more detail. The path selection circuitry comprises a first AND gate 134 and a second AND gate 136. The first AND gate 134 is arranged to receive bit number 30 of the address and an inverted bit number 31 of the address. The second AND gate 136 is arranged to receive bit number 31 (140) and inverted bit number 30 (138) of the address. In this embodiment, if bit number 31 is high or "1", this will define an access to DDR2. If bit number 30 is high or "1", this will define an access to DDR1. It should be appreciated that any other suitable technique can be used to determine if an address is associated with DDR1 or DDR2.

The first AND gate 134 is arranged to receive the bit number 0 of the path select value which will be high or "1" when path select has value 1 that is 01, thus indicating that the traffic towards DDR1 should be routed to link 2. The first AND gate will only provide a high output when bit number 0 of the path select signal value is "1", address bit 30 is "1" and address bit 31 is "0". Otherwise, the first AND gate will provide a low output "0".

The second AND gate 136 is arranged to receive bit number 1 of the path select signal which is high or "1" when the path select has value 2, that is 10 indicating that the traffic towards DDR2 should be routed to link 1. The second AND gate 136 will only provide a high output when bit number 1 of the path select signal value is "1", address bit 31 is "1" and address bit 30 is "0". Otherwise, the second AND gate will provide a low output "0".

The output of each of the AND gates 134 and 136 is input to an OR gate 142. In practice, only one of the AND gates 134 and 136 will be providing a high or "1" output and accordingly, which ever AND gate is providing a high output, that output will be propagated through the OR gate 142.

The output of the OR gate 142 is connected to a first exclusive or XOR gate 144 and a second XOR gate 146. The first XOR gate 144 also receives address bit 31 as an input while the second XOR gate 146 receives address bit 30 as an input.

The outputs of the first and second XOR 144 and 146 are input to the address decoder 130 as follows. If the output of the first AND gate is high, then the output of XOR gate 144 will be high and the output of the second XOR gate will be low. If the output of the second AND gate is high, then the output of XOR gate 144 will be low and the output of the second XOR gate will be high.

It should be appreciated that in some embodiments of the invention there may be a further path signal state 3 (11), both of the outputs of the two AND gates can be high at the same time. This will allow the inversion of address bits 30 and 31 which are presented to address decoder. The address decoder uses this information to determine which link is used to transport the requests from the initiators to the NoC.

In summary, by default traffic to DDR1 is routed on link1 and traffic to DDR2 is routed on link2. This occurs when the path select signal is 00, which means that the output of the AND gates is always low.

Some embodiments of the invention may implement the change path (that is link) mechanism only for accesses falling in DDR1 and DDR2 address ranges. In particular, the change path mechanism may work as follows:

If access is to DDR1 and path select bit number 0=1, then traffic must be routed on link2 (by default it would be link1).

If access is to DDR2 and path select bit number 1=1, then traffic must be routed on link1 (by default it would be link2).

In one embodiment, if path select bit number 1 is 1 and path select bit number 0 are asserted (i.e. both high) at the same time, the change path mechanism is performed for both accesses to DDR1 and accesses to DDR2.

Thus embodiments of the invention distinguish if an access is inside DDR1 or DDR2 ranges, by using address bits 31 and 30 of the destination address.

If address bit number 31=0 AND address bit number 30=1, then access to DDR1; if address bit number 31=1 AND address bit number 30=0, then access to DDR2. Thus to change the path and hence the link, when an address belongs to DDR1 or DDR2 ranges, address bits 31 and 30 are inverted.

The XOR gate can be used as controlled inverters. Thus the XOR gates invert address bits 31 and 30 only when a condition to change path is detected. This condition to change path is provided by the path select signal.

The path select signal can have two values only. The path select signal can have more than three values. The path select signal may be represented by one bit, two bits or more than two bits is some embodiments of the invention. The path select signal can be represented in any other suitable way such as with an encoded signal.

In some embodiments of the invention, the destination address on the link is unmodified regardless of whether or not the path select circuitry has modified the address to control the link on which the traffic is placed.

Figure 6:
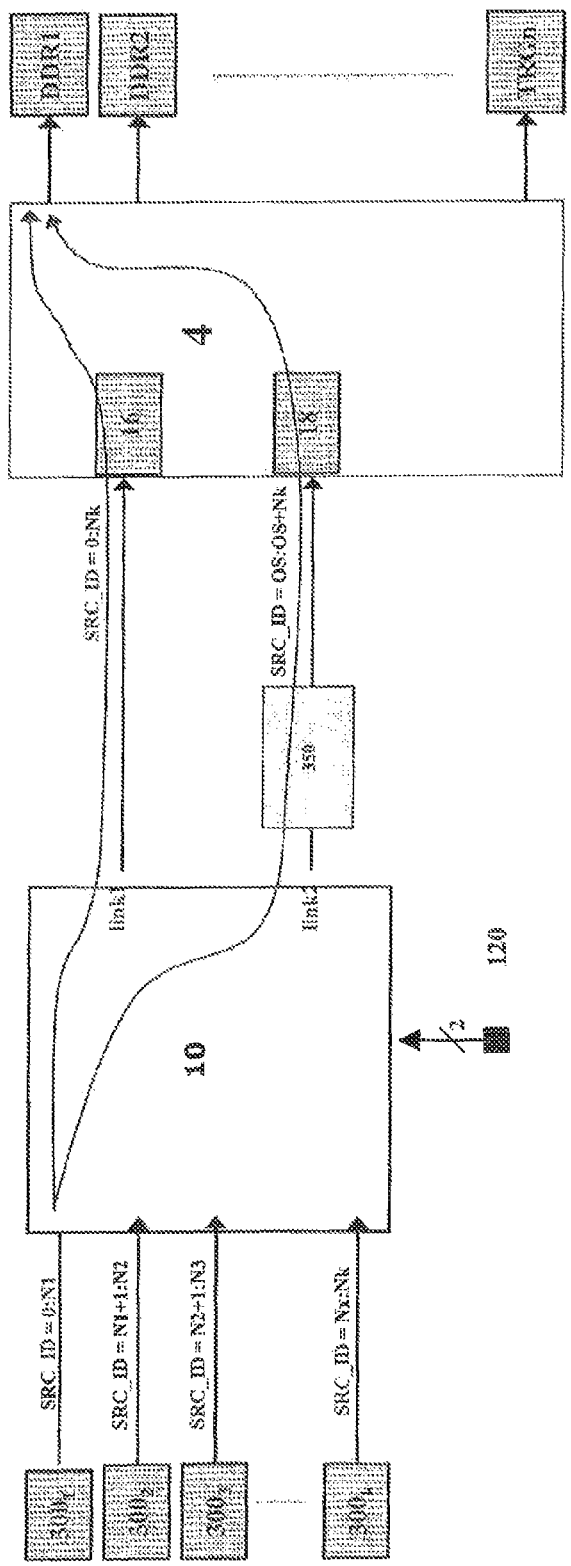
FIG. 6 shows schematically routing in one embodiment of the invention.

Reference is made to FIG. 6 which shows routing in an embodiment of the present invention. There are k initiators $300_1$-$300_K$. Each of the initiators has associated therewith its source ID. In this embodiment, the k initiators 300 have respective source IDs from n1 to nk. Each of the initiators is arranged to send data including the respective source ID to the bus node such as described previously.

By way of example, consider the first initiator $300_1$. The first initiator $300_1$ is arranged to send some data on the first link 108 and some data on the second link 110. This will as mentioned previously be determined based on the required quality of service. The data from the first initiator is routed via the first link 108 as usual, with the data being provided on the first link 108 with the source identity of the first initiator $300_1$. This is provided to the first network interface 16 of the network-on-chip 4. The network-on-chip routes the data received at the first network interface 16 to DDR1. The first initiator $300_1$ also has some data routed to the second link 110, dependent on the required quality of service.

Associated with the second link is a virtual source identifier generator 350. The virtual source identifier generator 350 is arranged to modify the source identifier of the data received from the initiator $300_1$. In one embodiment of the present invention, the virtual source ID generator is arranged to add an offset. In one solution, the offset is nk+1 where nk is the maximum value of the identifiers associated with the k initiators. However, it is possible that other offsets can be added or in some embodiments subtracted. For example, the initiators may have source identifiers falling in the range of 0 to 15. Accordingly, those same initiators would have source identifiers falling in the range of 16 to 31, when data is routed on the second link. In this example, the virtual source identifier generator will tie the source identifier fourth digit to 1. In other words, if the source identifier is 0001, to get the virtual source identifier for the second link, that would be 10001.

It should be appreciated that the source identifier needs to be modified so that any response which needs to be routed back to the initiator would be routed along the correct link. In other words, the source identifier in the packet which is routed to the DDR1 is used by the network-on-chip 4 to control to which network initiator and hence which link the response packet is sent. For a response packet, the virtual ID generator 350 will alter the source identifier back to the original source identifier so that the node 10 can route the response back to the appropriate initiator. In the embodiment where the source generator has tied the source ID [4] to 1, the virtual source ID generator simply needs to tie the fourth digit to 0 to return to the original value.

It should be appreciated that the virtual source identifier generator 350 can use any method in order to add the offset, either by for example simple logic or by tying the source ID signal.

In alternative embodiments, the source identifier generator may alternatively or additionally modify other source information.

It should be appreciated that the circuitry which is shown for selecting the link is by way of example only and can be instead provided by any other traffic controller. The circuitry used to provide such a traffic controller may be altered. In one embodiment, traffic controller may be provided at least in part by software. Of course the traffic controller is not limited in its implementation and can be achieved in any suitable manner.

The path select signal may be provided by a controller which is in configured to determine to which link the data from an initiator is to be allocated.

In the above embodiment, the information is being sent to DDR. It should be appreciated that this is by way of example only and the information may be sent to any other suitable destination which may be on the integrated circuit or off the integrated circuit.

The example described above has two links. In some embodiments of the invention, more than two links may be available to a given initiator with the link which is used being dependent on the required quality of service.

The example described above considers two destinations. Some embodiments of the invention may have one destination or three or more destinations. By way of example, there may be three or more DDR destinations in some embodiments. The destinations may be different and may not both be for example a DDR.

Embodiments of the present invention may be provided on an integrated circuit or a chip set.

Some embodiments of the invention may be incorporated in any suitable equipment.

It should be appreciated that the nodes described above may be replaced by any other suitable connection arrangement.

It should be appreciated that that virtual source identifier generator may modify the source identifier, the address of the initiator or may modify any other suitable source information.

While this detailed description has set forth some embodiments of the present invention, the appended claims cover other embodiments of the present invention which differ from the described embodiments according to various modifications and improvements. Other applications and configurations may be apparent to the person skilled in the art.

What is claimed is:

1. A connection arrangement, comprising:
a plurality of inputs configured to receive circuit switched traffic from a plurality of initiators;
a plurality of outputs configured to output said circuit switched traffic to a network on chip, each of said outputs being associated with a different quality of service; and
a traffic controller configured to direct the received circuit switched traffic to respective ones of the outputs in dependence on a quality of service associated with said circuit switched traffic and configured to modify an address associated with said circuit switched traffic in dependence on said quality of service associated with said circuit switched traffic, said address comprising a destination address for said circuit switched traffic.

2. The connection arrangement as claimed in claim 1, wherein said destination address is modified by inverting a predetermined bit of said destination address.

3. The connection arrangement as claimed in claim 1, wherein said traffic controller comprises an address decoder, said address decoder being configured to use said modified address to select a respective output.

4. The connection arrangement as claimed in claim 1, wherein said circuit switched traffic output on said outputs has said address in an unmodified form.

5. The connection arrangement as claimed in claim 1, comprising a source information modifier configured to modify source information of at least some of said circuit switched traffic.

6. The connection arrangement as claimed in claim 5, wherein said source information modifier is configured to modify said source information with an offset.

7. The connection arrangement as claimed in claim 5, wherein said source information modifier is configured to change the modified source information in response traffic to the unmodified source information.

8. The connection arrangement as claimed in claim 1, wherein for at least one target for said circuit switched traffic there is an associated default output, said traffic controller being configured to cause said circuit switched traffic to be output either to said default output or to another one of said outputs, in dependence on said quality of service associated with said circuit switched traffic.

9. The connection arrangement as claimed in claim 1, comprising an input configured to receive a control signal for controlling the output to which said circuitry directs said circuit switched traffic.

10. The connection arrangement as claimed in claim 1, wherein said quality of service comprises one or more of latency, bandwidth and best effort delivery information.

11. The connection arrangement as claimed in claim 1, further comprising said network on chip, said network on chip comprising a plurality of inputs, and a plurality of links between respective outputs of said connection arrangement and respective inputs of said network on chip.

12. The connection arrangement as claimed in claim 1, wherein the connection arrangement comprises an integrated circuit.

13. A method comprising:
receiving circuit switched traffic from a plurality of initiators;
directing the received circuit switched traffic to respective ones of a plurality of outputs in dependence on a quality of service associated with said circuit switched traffic, each of said outputs being associated with a different quality of service;
modifying an address associated with said circuit switched traffic in dependence on said quality of service associated with said circuit switched traffic, said address comprising a destination address for said circuit switched traffic; and
outputting, via said outputs, said circuit switched traffic to a network on chip.

14. The method of claim 13, wherein modifying comprises modifying said destination address by inverting a predetermined bit of said destination address.

15. The method of claim 13, further comprising decoding said modified address to select a respective output.

16. The method of claim 13, further comprising modifying source information of at least some of said circuit switched traffic.

17. The method of claim 16, wherein modifying source information modifier modifying said source information with an offset.

18. The method of claim 16, wherein modifying said source information comprises changing the modified source information in response traffic to the unmodified source information.

19. The method of claim 13, wherein for at least one target for said circuit switched traffic there is an associated default output, further comprising causing said circuit switched traffic to be output either to said default output or to another one of said outputs, in dependence on said quality of service associated with said circuit switched traffic.

20. The method of claim 13, further comprising receiving an input control signal and controlling the output to which said circuitry directs said circuit switched traffic based on said input control signal.

21. The method of claim 13, wherein said quality of service comprises one or more of latency, bandwidth and best effort delivery information.

22. The method of claim 13, wherein the plurality of outputs are associated with a corresponding plurality of links connecting to said network on chip.

* * * * *